US011111371B2

(12) United States Patent
Lummerstorfer et al.

(10) Patent No.: US 11,111,371 B2
(45) Date of Patent: Sep. 7, 2021

(54) HIGH FLOW AUTOMOTIVE EXTERIOR COMPOUNDS WITH EXCELLENT SURFACE APPEARANCE

(71) Applicant: BOREALIS AG, Vienna (AT)

(72) Inventors: Thomas Lummerstorfer, Gramastetten (AT); Daniela Mileva, Pilching (AT); Georg Grestenberger, St. Peter in der Au (AT)

(73) Assignee: BOREALIS AG, Vienna (AT)

(*) Notice: Subject to any disclaimer, the term of this patent is extended or adjusted under 35 U.S.C. 154(b) by 213 days.

(21) Appl. No.: 16/317,162

(22) PCT Filed: Jul. 14, 2017

(86) PCT No.: PCT/EP2017/067841
§ 371 (c)(1),
(2) Date: Jan. 11, 2019

(87) PCT Pub. No.: WO2018/019617
PCT Pub. Date: Feb. 1, 2018

(65) Prior Publication Data
US 2019/0241726 A1 Aug. 8, 2019

(30) Foreign Application Priority Data
Jul. 25, 2016 (EP) ..................................... 16180994

(51) Int. Cl.
C08L 23/30 (2006.01)
C08L 23/12 (2006.01)
C08L 23/14 (2006.01)
C08K 3/013 (2018.01)
C08K 3/34 (2006.01)
C08K 5/14 (2006.01)
B29C 45/00 (2006.01)
B29K 23/00 (2006.01)
B29L 31/30 (2006.01)
C08L 23/16 (2006.01)

(52) U.S. Cl.
CPC .............. C08L 23/30 (2013.01); C08K 3/013 (2018.01); C08K 3/34 (2013.01); C08K 5/14 (2013.01); C08L 23/12 (2013.01); C08L 23/142 (2013.01); B29C 45/0001 (2013.01); B29K 2023/12 (2013.01); B29L 2031/30 (2013.01); C08L 23/16 (2013.01); C08L 2205/035 (2013.01); C08L 2207/02 (2013.01)

(58) Field of Classification Search
CPC ......... C08K 5/14; C08L 23/12; C08L 23/142; C08L 3/14; C08L 2205/035; C08L 23/16
USPC ...................................................... 524/451
See application file for complete search history.

(56) References Cited

U.S. PATENT DOCUMENTS

| 5,272,236 A | 12/1993 | Lai et al. | |
| 5,852,100 A * | 12/1998 | Sadatoshi | ............... C08L 53/00 524/505 |
| 2004/0092631 A1 | 5/2004 | Joseph | |
| 2012/0108728 A1* | 5/2012 | Tranninger | ............. C08L 23/12 524/451 |
| 2015/0057408 A1* | 2/2015 | Eckmayr | ................. C08L 23/10 524/528 |

FOREIGN PATENT DOCUMENTS

| CN | 102964686 A | 3/2013 |
| CN | 104736630 A | 6/2015 |
| EP | 0491566 A1 | 6/1992 |
| EP | 0586390 A1 | 3/1994 |
| EP | 0591224 A1 | 4/1994 |
| EP | 0739941 A1 | 10/1996 |
| EP | 0887379 A1 | 12/1998 |
| EP | 1634919 A1 | 3/2006 |
| RU | 2588568 C2 | 7/2016 |
| WO | 8707620 A1 | 12/1987 |
| WO | 9212182 A1 | 7/1992 |
| WO | 9219653 A1 | 11/1992 |
| WO | 9219658 A1 | 11/1992 |
| WO | 9924478 A1 | 5/1999 |
| WO | 9924479 A1 | 5/1999 |
| WO | 0068315 A1 | 11/2000 |
| WO | 2004000899 A1 | 12/2003 |
| WO | 2004111095 A1 | 12/2004 |
| WO | 2010142540 A1 | 12/2010 |
| WO | 2010149529 A1 | 12/2010 |
| WO | 2015091810 A1 | 6/2015 |

OTHER PUBLICATIONS

Zweifel, et al., "Plastic Additives Handbook," 5th edition, Hanser Publications, 2001, pp. 967-990.
Zweifel, et al., "Plastic Additives Handbook," 6th edition, Hanser Publications, 2009, pp. 1041-1090.
Resconi, et al., "Selectivity in Propene Polymerization with Metallocene Catalysts," Chem. Rev., 2000, vol. 100, pp. 1253-1345.
Zhou, et al., "A new decoupling method for accurate quantification of polyethylene copolymer composition and triad sequence distribution with 13C NMR," Journal of Magnetic Resonance, 2007, vol. 187, pp. 225-233.
Busico, et al., "Alk-1-ene Polymerization in the Presence of a Monocyclopentadienyl Zirconium (IV) Acetamidinate Catalyst: Microstructural and Mechanistic Insights," Macromolecular Rapid Commun., 2007, vol. 28, pp. 1128-1134.
Randall, et al., "A Review of High Resolution Liquid 13Carbon Nuclear Magnet Resonance Characterizations of Ethylene-Based Polymers," Rev. Macromol. Chem. Phys. 1989, vol. C29, pp. 201-317.
Klimke, et al., "Optimisation and Application of Polyolefin Branch Quantification by Melt-State 13C NMR Spectroscopy," Macromolecular Chemistry and Physics, 2006, vol. 207, pp. 382-395.

(Continued)

Primary Examiner — Doris L Lee
(74) Attorney, Agent, or Firm — Lowenstein Sandler LLP

(57) ABSTRACT

The present invention is directed to propylene composition applicable for high flow automotive exterior compounds with excellent surface appearance, said composition comprising a modified polypropylene composition and an inorganic filler.

13 Claims, No Drawings

(56) References Cited

OTHER PUBLICATIONS

Castignolles, et al., "Detection and quantification of branching in polyacrylates by size-exclusion chromatography (SEC) and melt-state 13C NMR spectroscopy," Polymer, 2009, vol. 50, pp. 2373-2383.
Cheng, H.N., "13C NMR Analysis of Ethylene-Propylene Rubbers," Macromolecules, 1984, vol. 17, pp. 1950-1955.
Kakugo, et al., "13C NMR Determination of Monomer Sequence Distribution in Ethylene-Propylene Copolymers Prepared with gamma-TiCl3—Al (C2H5)2Cl," Macromolecules, 1982, vol. 15, pp. 1150-1152.
Filip, et al., "Heteronuclear decoupling under fast MAS by a rotor-synchronized Hahn-echo pulse train," Journal of Magnetic Resonance, 2005, vol. 176, pp. 239-243.
Griffin, et al., "Low-load Rotor-Synchronised Hahn-echo Pulso Train (RS-HEPT) 1H Decoupling in Solid-State NMR: factors affecting MAS Spin-echo Dephasing Times," Magnetic Resonance in Chemistry, 2007, vol. 45, pp. S198-S208.
Frank, et al., "New measurement method for appearance of flow marks or tiger stripes defect for improved quantification and analysis," Proc. of the SPIE, 2008, vol. 6831, 2 pages.
European Search Report for European Patent Application No. 16180994.2, dated Oct. 28, 2016, 5 pages.
Parkinson, et al., "Effect of Branch Length on 13C NMR Relaxation Properties in Molten Poly[ethylene-co-(alpha-olefin)] Model Systems," Macromolecular Chemistry and Physics, 2007, vol. 208, pp. 2128-2133.
Pollard, et al., "Observation of Chain Branching in Polyethylene in the Solid State and Melt via 13C NMR Spectroscopy and Melt NMR Relaxation Time Measurements," Macromolecules, 2004, vol. 37, pp. 813-825.
Wang, et al., "Structural Analysis of Ethylene/Propylene Copolymers Synthesized with a Constrained Geometry Catalyst," Macromolecules, 2000, vol. 33, pp. 1157-1162.
Singh, et al., "Triad sequence determination of ethylene-propylene copolymers—application of quantitative 13C NMR," Polymer Testing, 2009, vol. 28, pp. 475-479.
International Search Report and Written Opinion for International Application No. PCT/EP2017/067841, dated Sep. 4, 2017, 10 pages.
English Translation of Search Report for Russian Patent Application No. 2019104125 dated Dec. 5, 2019, 2 pages.
English Translation of Office Action for Russian Patent Application No. 2019104125 dated Dec. 5, 2019, 3 pages.
Li et al., "Development and Application of Scientific Grain", Pan Asia Technical Automotive Center, Ltd., China Academic Journal Electronic Publishing House, 2010, 5 pages.
Office Action for Chinese Patent Application No. 201780036031.4 and English translation thereof, dated Feb. 18, 2021.

\* cited by examiner

HIGH FLOW AUTOMOTIVE EXTERIOR COMPOUNDS WITH EXCELLENT SURFACE APPEARANCE

CROSS-REFERENCE TO RELATED APPLICATIONS

This application is a national phase entry under 35 U.S.C. § 371 of International Application No. PCT/EP2017/067841, filed on Jul. 14, 2017, which claims the benefit of priority of European Patent Application No. 16180994.2, filed on Jul. 25, 2016. The contents of these applications are hereby incorporated by reference herein in their entirety.

The present invention is directed to a composition comprising a modified polypropylene composition and an inorganic filler. Said modified polypropylene composition is obtained by treatment of a polypropylene composition comprising a heterophasic composition and a plastomer with a peroxide. The invention is also directed to an article made from said composition as well. Further, the invention is directed to a process for preparing said composition as well as the use of a peroxide to reduce the tiger skin of a polypropylene composition.

Excellent surface appearance of polypropylene composites for interior and exterior automotive applications is of prime importance for many unpainted and visible parts. One common problem is flow marks, commonly referred to as "tiger stripes", i.e. alternating glossy and hazy sections on the surface of injection moulded parts. Tiger stripes are essentially deteriorating the surface quality of injection moulded parts and composite design needs to provide a robust solution covering a broad tiger stripe-free processing window.

One common approach to suppress tiger stripe formation are specially designed PP-HECOS (often referred to as "tiger stripe killers") with a propylene-rich, highly viscous disperse rubber phase which is added to PP compounds in certain amounts to reduce elongation of dispersed rubber particles under shear stress thus leading to a more round-shaped elastomer phase favouring good surface appearance.

Especially for high flow exterior applications with a very demanding mechanical property profile, e.g. bumpers with low wall thickness, this approach is facing some serious limitations since excellent stiffness impact balance is a basic prerequisite for such applications. Such high-flow exterior compounds usually contain a lot of rubber, typically the internal rubber of a PP-HECO as well as an external rubber being an ethylene-α-olefin rubber. Since both internal and external rubber are contributing essentially to tiger stripe formation, the application of such a composition leads to pronounced tiger stripe formation under industrial processing conditions.

To reduce or eliminate flow marks in such compounds, a rather high weight fraction of tiger stripe killers is necessary to reach satisfying results. Unfortunately, the reduction of tiger-stripes when adding "tiger stripe killer" often goes hand in hand with reduced flowability of the compound due to the highly viscous rubber phase of the "tiger stripe killer".

Thus, there is a need for a polypropylene composition applicable for automotive exterior compounds with improved surface appearance and high flowability.

Therefore, it is an object the present invention to provide a polymer composition of high flowability which can be injection molded to obtain automotive compounds showing reduced tiger skin while the mechanical properties are kept on a high level.

Accordingly, the present invention is directed to a composition (C) comprising a modified polypropylene composition (mPP) and an inorganic filler (F), wherein said modified polypropylene composition (mPP) is obtained by treatment of a polypropylene composition (PP) with a peroxide (PO), said polypropylene composition (PP) comprising
  (a) a heterophasic composition (HECO), comprising
    (a1) a (semi)crystalline polypropylene (PP1) and
    (a2) an elastomeric ethylene/propylene copolymer (EPR) dispersed in said (semi)crystalline polypropylene (PP1),
  (b) a plastomer (PL) being a copolymer of ethylene and at least one C4 to C20 α-olefin, and
  (c) optionally a high flow polypropylene (HPP), said high flow polypropylene (HPP) has preferably a higher melt flow rate $MFR_2$ (230° C.), measured according to ISO 1133, than the (semi)crystalline polypropylene (PP1).

It is especially preferred that the modified polypropylene composition (mPP) has
  (i) a melt flow rate $MFR_2$ (230° C.) measured according to ISO 1133 above 32 g/10 min, and
  (ii) a ratio IV(XCS)/IV(XCI) of at least 2.10, wherein IV(XCS) is the intrinsic viscosity IV determined according to DIN ISO 1628/1 (in Decalin at 135° C.) of the xylene soluble fraction XCS and IV(XCI) is the intrinsic viscosity IV determined according to DIN ISO 1628/1 (in Decalin at 135° C.) of the xylene insoluble fraction XCI.

Alternatively to the previous paragraphs, the present invention is directed to a composition (C) comprising a modified polypropylene composition (mPP) and an inorganic filler (F), wherein said modified polypropylene composition (mPP) is obtained from a polypropylene composition (PP) comprising
  (a) a heterophasic composition (HECO), comprising
    (a1) a (semi)crystalline polypropylene (PP1) and
    (a2) an elastomeric ethylene/propylene copolymer (EPR) dispersed in said (semi)crystalline polypropylene (PP1),
  (b) a plastomer (PL) being a copolymer of ethylene and at least one C4 to C20 α-olefin, and
  (c) optionally a high flow polypropylene (HPP), said high flow polypropylene (HPP) has preferably a higher melt flow rate $MFR_2$ (230° C.), measured according to ISO 1133, than the (semi)crystalline polypropylene (PP1),
wherein the modified polypropylene composition (mPP) has
  (i) a melt flow rate $MFR_2$ (230° C.) measured according to ISO 1133 above 32 g/10 min, and
  (ii) a ratio IV(XCS)/IV(XCI) of at least 2.10, wherein IV(XCS) is the intrinsic viscosity IV determined according to DIN ISO 1628/1 (in Decalin at 135° C.) of the xylene soluble fraction XCS and IV(XCI) is the intrinsic viscosity IV determined according to DIN ISO 1628/1 (in Decalin at 135° C.) of the xylene insoluble fraction XCI.

It is especially preferred that said modified polypropylene composition (mPP) is obtained by treatment of a polypropylene composition (PP) with a peroxide (PO).

According to one embodiment of the present invention, said plastomer (PL) is a copolymer of ethylene and 1-butene or 1-octene.

According to a further embodiment of the present invention, the modified polypropylene composition (mPP) has (i) an intrinsic viscosity IV determined according to DIN ISO 1628/1 (in Decalin at 135° C.) of the xylene soluble fraction XCS below 2.30 dl/g and
(ii) an intrinsic viscosity IV determined according to DIN ISO 1628/1 (in Decalin at 135° C.) of the xylene insoluble fraction XCI below 1.05 dl/g.

According to another embodiment of the present invention, the weight ratio of the heterophasic composition (HECO) and the plastomer (PL) [(HECO)/(PL)] in the polypropylene composition (PP) is in the range of 0.1 to 10.0.

According to still another embodiment of the present invention, the polypropylene composition (PP) comprises 3 to 15 wt.-%, based on the overall weight of the polypropylene composition (PP), of the high flow polypropylene (HPP) preferably having a higher melt flow rate $MFR_2$ (230° C.), measured according to ISO 1133, than the (semi)crystalline polypropylene (PP1).

It is especially preferred that the composition (C) comprises
(a) 45 to 95 wt.-% of the modified polypropylene composition (mPP) and
(b) 5 to 30 wt.-% of the inorganic filler (F),
based on the overall weight of the composition (C).

According to one embodiment of the present invention, the heterophasic composition (HECO) has
(a) a comonomer content, based on the total weight of the heterophasic composition (HECO), in the range of 3 to 20 wt.-%,
and/or
(b) a xylene soluble fraction (XCS) in the range of 10 to 35 wt.-%, and/or
(c) a melt flow rate $MFR_2$ (230° C.) measured according to ISO 1133 from 40 to 100 g/10 min According to another embodiment of the present invention, the xylene soluble fraction (XCS) of the heterophasic composition (HECO) has
(a) an intrinsic viscosity (IV) determined according to DIN ISO 1628/1 (in Decalin at 135° C.) in the range of 1.5 to 4.5 dl/g,
(b) a comonomer content, based on the total weight of the xylene soluble fraction (XCS) of the heterophasic composition (HECO), in the range of 25 to 55 wt.-%.

According to a further embodiment of the present invention, the plastomer (P) has
(a) a melt flow rate MFR (190° C.) measured according to ISO 1133 from 0.05 to 5.0 g/10 min
(b) a comonomer content, based on the total weight of the plastomer (PL), in the range of 5 to 25 mol-% and
(c) a density equal or below 0.880 g/cm³.

It is especially preferred that the inorganic filler (F) is talc.

The present invention is also directed to an article comprising the composition (C) as described above, said article preferably being an injection moulded automotive article.

Further, the present invention is directed to the use of a peroxide (PO) to reduce tiger skin of a polypropylene composition (PP) according to any one of the preceding claims, wherein a composition (C) as described above is obtained.

It is especially preferred that the reduction of tiger skin is accomplished in case of MSE values equal or below 30.

The present invention is also directed to a process for the preparation of the composition (C) as described above, wherein
(a)
(a1) the polypropylene composition (PP) comprising the heterophasic composition (HECO), the plastomer (PL) and optionally the high flow polypropylene (HPP) is extruded in an extruder in the presence of the peroxide (PO), thereby obtaining the modified polypropylene composition (mPP), and
(b1) said modified polypropylene composition (mPP) is melt blended with the inorganic filler (F),
or
(b) the polypropylene composition (PP) comprising the heterophasic composition (HECO), the plastomer (PL), optionally the high flow polypropylene (HPP) and the inorganic filler (F) are extruded in an extruder in the presence of the peroxide (PO).

According to the present invention, peroxide was added in small amounts to a typical automotive exterior compound. The peroxide increases the melt flow rate and, therefore, the flowability by visbreaking of the of the heterophasic composition (HECO). The peroxide changes the ratio between the intrinsic viscosities of the XCS and XCI parts, thus the final morphology of the dispersed phase. Further, the robustness towards shear-elongation and finally tiger stripe formation of the presently claimed composition is increased.

The invention will now be described in more detail.

The Composition

The composition (C) according to the present invention comprises a modified polypropylene composition (mPP) and an inorganic filler (F). Said modified polypropylene composition (mPP) is obtained by treating a polypropylene composition (PP) with a peroxide (PO).

Said polypropylene composition (PP) must comprise the heterophasic composition (HECO) and the plastomer (PL). Optionally, said polypropylene composition may comprise the high flow polypropylene (HPP). Thus, in a preferred embodiment, the polypropylene composition (PP) and thus also the modified polypropylene composition (mPP) comprises the heterophasic composition (HECO), the plastomer (PL) and the high flow polypropylene (HPP).

The composition (C) of the present invention must comprise the modified polypropylene composition (mPP) and the inorganic filler (F). In addition the composition may comprise alpha nucleating agents (NU) and additives (AD). Accordingly, it is preferred that the modified polypropylene composition (mPP) and the inorganic filler (F) make up together at least 80 wt.-%, more preferably at least 85 wt.-%, still more preferably at least 90 wt.-%, like at least 95 wt.-% of the composition (C). In one specific embodiment the composition (C) consists of the modified polypropylene composition (mPP) and the inorganic filler (F) and the optional polymeric carrier material of the peroxide (P), alpha nucleating agents (NU) and/or additives (AD).

Preferably the weight ratio between the modified polypropylene composition (mPP) and the inorganic filler (F) [(mPP)/(F)] is in the range of 2.0 to 10.0, more preferably in the range of 3.0 to 8.0, more preferably in the range of 5.0 to 7.0.

Accordingly, the composition (C) preferably comprises
(a) 45 to 95 wt.-%, more preferably 55 to 90 wt.-%, still more preferably 60 to 85 wt.-%, like 70 to 83 wt.-%, based on the total weight of the composition (C), of the modified polypropylene composition (mPP), and
(b) 5 to 30 wt.-%, more preferably 6 to 25 wt.-%, still more preferably 8 to 20 wt.-%, like 10 to 15 wt.-%, based on the total weight of the composition (C), of the inorganic filler (F).

As outlined above, the modified polypropylene composition (mPP) is obtained by treatment of the polypropylene composition (PP) with a peroxide (PO). Preferred peroxides (PO) are listed below under the section "the modified polypropylene composition (mPP)".

The peroxide (PO) is preferably introduced in the form of a master batch. That is the peroxide (PO) is pre-mixed with a polymeric carrier material. Said polymeric carrier material does not contribute to the improved properties of the composition (C). Preferably the polymeric carrier material is a polyethylene or a polypropylene, the latter being preferred. Typically the polymeric carrier material is different to heterophasic composition (HECO) and the plastomer (PL). Preferably the polymeric carrier material is a propylene homopolymer. The amount of said polymeric carrier material is preferably in the range of 0.01 to 5 wt.-%, more preferably in the range of 0.02 to 2 wt.-%, still more preferably in the range of 0.1 to 1, like in the range of 0.1 to 0.5 wt.-%, based on the based on the total weight of the composition (C).

Thus the composition (C) preferably comprises
(a) 45 to 95 wt.-%, more preferably 55 to 90 wt.-%, still more preferably 60 to 85 wt.-%, like 70 to 83 wt.-%, based on the total weight of the composition (C), of the modified polypropylene composition (mPP), and
(b) 5 to 30 wt.-%, more preferably 6 to 25 wt.-%, still more preferably 8 to 20 wt.-%, like 10 to 15 wt.-%, based on the total weight of the composition (C), of the inorganic filler (F).
(c) 0.01 to 5 wt.-%, more preferably in the range of 0.02 to 2 wt.-%, still more preferably in the range of 0.1 to 1, like in the range of 0.1 to 0.5 wt.-%, based on the based on the total weight of the composition (C), of the polymeric carrier material of the peroxide (P).

As mentioned above the composition (C) may comprise in addition alpha-nucleating agents (NU) and/or additives (AD). According to this invention, the alpha nucleating agent (NU) nor the filler (F) is an additive (AD). Further, according to this invention the filler (F) is not an alpha nucleating agent (NU). Accordingly it is preferred that the composition (C) contains up to 5.0 wt.-%, preferably $1.0 \times 10^{-5}$ to 4.0 wt.-%, more preferably $2.0 \times 10^{-5}$ to 2.0 wt.-%, based on the total weight of the composite, of alpha nucleating agents (NU) and/or up to 8.0 wt.-%, preferably 0.1 to 6.0 wt.-%, more preferably 0.5 to 4.0 wt.-%, based on the total weight of the composite, of additives (AD).

Therefore it is especially preferred that the composition consists of
(a) 35 to 80 wt.-%, more preferably 40 to 70 wt.-%, still more preferably 45 to 65 wt.-%, like 48 to 63 wt.-%, based on the total weight of the composition (C), of the modified polypropylene composition (mPP),
(b) 5 to 30 wt.-%, more preferably 6 to 25 wt.-%, still more preferably 8 to 20 wt.-%, like 10 to 15 wt.-%, based on the total weight of the composition (C), of the inorganic filler (F),
(c) 0.01 to 5 wt.-%, more preferably in the range of 0.02 to 2 wt.-%, still more preferably in the range of 0.1 to 1, like in the range of 0.1 to 0.5 wt.-%, based on the based on the total weight of the composition (C), of the polymeric carrier material of the peroxide (P),
(d) optionally up to 5.0 wt.-%, preferably $1.0 \times 10^{-5}$ to 4.0 wt.-%, more preferably $2.0 \times 10^{-5}$ to 2.0 wt.-% based on the total weight of the composite, of alpha nucleating agents (NU), and
(e) optionally up to 8.0 wt.-%, preferably 0.1 to 6.0 wt.-%, more preferably 0.5 to 4.0 wt.-%, based on the total weight of the composite, of additives (AD).

It is especially preferred that the composition (C) has a melt flow rate MFR$_2$ (230° C., 2.16 kg) above 25 g/10 min, more preferably in the range of 26 to 50 g/10 min, still more preferably in the range of 28 to 48 g/10 min, like in the range of 30 to 45 g/10 min.

In a preferred embodiment, the composition (C) has a density in the range of 0.890 to 0.990 g/cm$^3$, more preferably in the range of 0.950 to 0.985 g/cm$^3$, still more preferably in the range of 0.955 to 0.980 g/cm$^3$, like in the range of 0.960 to 0.978 g/cm$^3$.

Preferably the composition (C) has a flexural modulus below 2000 MPa, more preferably in the range of 1000 to 1900 MPa, still more preferably in the range of 1200 to 1500 MPa, like in the range of 1300 to 1490 MPa.

Additionally or alternatively to the previous paragraph, the composition (C) has a notched Izod impact strength (23° C.) of at least 5 kJ/m$^2$, more preferably in the range of 5 to 30 kJ/m$^2$, still more preferably in the range of 8 to 28 kJ/m$^2$, like in the range of 10 to 25 kJ/m$^2$, and/or a notched Izod impact strength (−20° C.) of at least 2 kJ/m$^2$, more preferably in the range of 2 to 15 kJ/m$^2$, still more preferably in the range of 3 to 10 kJ/m$^2$, like in the range of 4 to 8 kJ/m$^2$.

The composition according to the invention may be pelletized and compounded using any of the variety of compounding and blending methods well known and commonly used in this field.

In the following the individual components of the composition are defined in more detail.

The Modified Polypropylene Composition (mPP)

As mentioned above, the modified polypropylene composition (mPP) is obtained by treating a polypropylene composition (PP) with a peroxide (PO). Said polypropylene composition (PP) must comprise the heterophasic composition (HECO) and the plastomer (PL) and may comprise additionally the high flow polypropylene (HPP). In a preferred embodiment the heterophasic composition (HECO), the plastomer (PL) and the optional high flow polypropylene (HPP) make up together at least 80 wt.-%, more preferably at least 85 wt.-%, still more preferably at least 90 wt.-%, like at least 95 wt.-% of the modified polypropylene composition (mPP). In one specific embodiment the modified polypropylene composition (mPP) consists of the heterophasic composition (HECO) the plastomer (PL) and, optionally, the high flow polypropylene (HPP).

The polymeric carrier material of the peroxide (P), the alpha nucleating agents (NU) and the additives (AD) are not considered to be part of the modified polypropylene composition (mPP) but of the final composition (C).

The weight ratio of the heterophasic composition (HECO) and the plastomer (PL) [(HECO)/(PL)] in the modified polypropylene composition (mPP) is preferably in the range of 0.1 to 10.0, more preferably from 1.0 to 8.0, still more preferably from 1.2 to 5.0, like from 2.6 to 4.0.

The weight ratio of the heterophasic composition (HECO) and the high flow polypropylene (HPP) [(HECO)/(HPP)] in the modified polypropylene composition (mPP) is preferably in the range of 1.0 to 20.0, more preferably from 3.0 to 18.0, still more preferably from 6.0 to 15.0, like from 8.0 to 12.0.

As can be taken from the wording "modified" the polypropylene composition (mPP) is a composition, i.e. the polypropylene composition (PP), which has been chemically treated by the use of peroxide (PO). In the present case the modified polypropylene composition (mPP) is the polypropylene composition (PP) which has been chemically modified either due to cross-linking of individual polymer chains, branching and/or increasing the ratio between the intrinsic viscosities of the XCS and XCI part. As can be seen by high resolution microscopy typically the modified polymer composition shows coarsening of the rubber-phase domains. Observation of coarse rubber particles could be due to increase of the viscosity ratio between the XCS and XCI part (IV(XCS)/IV(XCI)).

As mentioned above to obtain the modified the polypropylene composition (mPP) the polypropylene composition (PP) must be treated with peroxide.

Like the modified polypropylene composition (mPP), also the polypropylene composition (PP) must comprise the heterophasic composition (HECO) and the plastomer (PL) and may comprise additionally the high flow polypropylene (HPP). In a preferred embodiment the heterophasic composition (HECO), the plastomer (PL) and the optional high flow polypropylene (HPP) make up together at least 80 wt.-%, more preferably at least 85 wt.-%, still more preferably at least 90 wt.-%, like at least 95 wt.-% of the polypropylene composition (PP). In one specific embodiment the polypropylene composition (PP) consists of the heterophasic composition (HECO), the plastomer (PL) and optionally the high flow polypropylene (HPP).

The polymeric carrier material of the peroxide (P), the alpha nucleating agents (NU) and the additives (AD) are not considered to be part of the polypropylene composition (PP) but of the final composition (C).

The weight ratio of the heterophasic composition (HECO) and the plastomer (PL) [(HECO)/(PL)] in the polypropylene composition (PP) is preferably in the range of 0.1 to 10.0, more preferably from 1.0 to 8.0, still more preferably from 1.2 to 5.0, like from 2.6 to 4.0.

The weight ratio of the heterophasic composition (HECO) and the high flow polypropylene (HPP) [(HECO)/(HPP)] in the polypropylene composition (PP) is preferably in the range of 1.0 to 20.0, more preferably from 3.0 to 18.0, still more preferably from 6.0 to 15.0, like from 8.0 to 12.0.

It is preferred that the melt flow rate $MFR_2$ (230° C.) measured according to ISO 1133 of the modified polypropylene composition (mPP) is above 32 g/10 min, more preferably in a range of 33 to 55 g/10 min, still more preferably in a range of 34 to 50 g/10 min, like in a range of 35 to 45 g/10 min.

Additionally to the previous paragraph, it is preferred that the modified polypropylene composition (mPP) has a comonomer content in the range of 7.5 to 21.0 mol-%, more preferably in the range of 8.0 to 18.0 mol-%, still more preferably in the range of 10.0 to 14.0 mol-%.

Further, it is preferred that the intrinsic viscosity IV determined according to DIN ISO 1628/1 (in Decalin at 135° C.) of the xylene soluble fraction XCS of the modified polypropylene composition (PP) is below 2.30 dl/g, more preferably below 2.29 dl/g.

Additionally, it is preferred that the intrinsic viscosity IV determined according to DIN ISO 1628/1 (in Decalin at 135° C.) of the xylene insoluble fraction XCI of the modified polypropylene composition (PP) is below 1.05 dl/g, more preferably below 1.04 dl/g, still more preferably below 1.03 dl/g.

It is especially preferred that the ratio IV(XCS)/IV(XCI) of the modified polypropylene composition (mPP) is at least 2.10, more preferably at least 2.11, still more preferably at least 2.12, wherein IV(XCS) is the intrinsic viscosity IV determined according to DIN ISO 1628/1 (in Decalin at 135° C.) of the xylene soluble fraction XCS and IV(XCI) is the intrinsic viscosity IV determined according to DIN ISO 1628/1 (in Decalin at 135° C.) of the xylene insoluble fraction XCI.

Additionally, it is preferred that the comonomer content of the xylene soluble fraction XCS of the modified polypropylene composition (mPP) is in the range of 20.0 to 70.0 mol-%, more preferably in the range of 35.0 to 65.0 mol-%, still more preferably in the range of 45.0 to 61.0 mol-%.

The individual properties of heterophasic composition (HECO), the plastomer (PL) and the optional high flow polypropylene (HPP) in the polypropylene composition (PP) can be taken from the information below.

The peroxide (PO) for the modification of the polypropylene composition (PP) is preferably thermally decomposing free radical-forming agents. More preferably the peroxide (PO), i.e. the thermally decomposing free radical-forming agent, is selected from the group consisting of acyl peroxide, alkyl peroxide, hydroperoxide, perester and peroxycarbonate.

The following listed peroxides are in particular preferred:

Acyl peroxides: benzoyl peroxide, 4-chlorobenzoyl peroxide, 3-methoxybenzoyl peroxide and/or methyl benzoyl peroxide.

Alkyl peroxides: allyl t-butyl peroxide, 2,2-bis(t-butylperoxybutane), 2,5-dimethyl-2,5-di-(tert-butylperoxy) hexane, 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide.

Peresters and peroxy carbonates: butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate, or mixtures of these above listed free radical-forming agents.

In a preferred embodiment, the peroxide (PO) is an alkyl peroxide. It is especially preferred that the peroxide (PO) is 2,5-dimethyl-2,5-di-(tert-butylperoxy)hexane.

In a first embodiment of the of the modification process, the modified polypropylene composition (mPP) is obtained in a first step by extruding the polypropylene composition (PP) comprising the heterophasic composition (HECO), the plastomer (PL) and optionally the high flow polypropylene (HPP) in an extruder in the presence of the peroxide (PO).

Said modified polypropylene composition (mPP) is subsequently (melt) blended with the inorganic filler (F) to obtain the final composition (C).

In a second embodiment of the process, the polypropylene composition (PP) comprising the heterophasic composition (HECO), the plastomer (PL) and optionally the high flow polypropylene (HPP) and the inorganic filler (F) are extruded in an extruder in the presence of the peroxide (PO) to obtain the final composition (C).

The modification can be in particular effected by dosing the polypropylene composition (PP) or a mixture of the polypropylene composition (PP) and the inorganic filler (F) into a twin screw extruder like ZSK 32 with preferably a temperature profile 80/200/210/220/220/230/230/220/225/ 220° C. and a screw speed of 300 rpm. The peroxide (PO), like 2,5-dimethyl-2,5-di-(tert-butylperoxy)hexane, is preferably added in a form of a masterbatch with a polyolefin which is dosed directly into the extruder with all of the components, achieving a concentration of 0.001 to 1.0 wt.-% of the peroxide (PO), based on the mixture. The polymer melt/liquid/gas mixture is passed through the extruder, then to intensive devolatilisation, discharged and pelletised obtaining thereby the modified polypropylene composition (mPP) or the final composition (C).

The properties of the heterophasic composition (HECO), especially the properties of the ethylene/propylene copolymer (EPR) of the heterophasic composition (HECO), and the properties of the plastomer (PL) may change due to the use of the peroxide (PO). This applies in particular for the intrinsic viscosity and the melt flow rate of the ethylene/propylene copolymer (EPR) of the heterophasic composition (HECO) and the properties of the plastomer (PL). The properties of the matrix, i.e. of the (semi)crystalline polypropylene (PP1), of the heterophasic composition (HECO) are not affected. In some cases the melt flow rate $MFR_2$ (230° C.) of the (semi)crystalline polypropylene (PP1) and of the high flow polypropylene (HPP) might be slight enhanced due to the use of peroxide.

The Heterophasic Composition (HECO)

As mentioned above the properties of the heterophasic composition (HECO) may change due to the use of the peroxide (PO). That is the properties defined in this section may differ after the heterophasic composition (HECO) has been treated with the peroxide (PO). What to some extent may be effected is the properties of the ethylene/propylene copolymer (EPR) and the polypropylene matrix and thus the viscosity of the xylene soluble fraction (XCS) and the xylene cold insoluble fraction (XCI) of the heterophasic composition (HECO), e.g. the intrinsic viscosity (IV).

The heterophasic composition (HECO) preferably comprises a (semi)crystalline polypropylene (PP1) as a matrix in which an elastomeric propylene copolymer (EPR) is dispersed. Accordingly the elastomeric propylene copolymer (EPR) is (finely) dispersed in the (semi)crystalline polypropylene (PP1). In other words the (semi)crystalline polypropylene (PP1) constitutes a matrix in which the elastomeric propylene copolymer (EPR) forms inclusions in the matrix, i.e. in the (semi)crystalline polypropylene (PP1). Thus the matrix contains (finely) dispersed inclusions being not part of the matrix and said inclusions contain the elastomeric propylene copolymer (EPR). The term "inclusion" according to this invention shall preferably indicate that the matrix and the inclusion form different phases within the heterophasic composition (HECO), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Preferably, the heterophasic composition (HECO) has a melt flow rate $MFR_2$ (230° C., 2.16 kg) in the range of 10 to 120 g/10 min, more preferably in the range of 20 to 100 g/10 min, still more preferably in the range of 40 to 80 g/10 min.

As mentioned above, the heterophasic composition (HECO) according to this invention preferably comprises
(a) a (semi)crystalline polypropylene (PP1) as the matrix (M) and
(b) an elastomeric propylene copolymer (EPR).

Preferably the weight ratio between the (semi)crystalline polypropylene (PP1) and the elastomeric propylene copolymer (EPR) [PP1/EPR] of the heterophasic composition (HECO) is in the range of 90/10 to 40/60, more preferably in the range of 85/15 to 45/55, yet more preferably in the range of 83/17 to 50/50, like in the range of 82/18 to 60/40.

Preferably, the heterophasic composition (HECO) has an ethylene content in the range of 5 to 25 mol-%, more preferably in the range of 6 to 20 mol-%, still more preferably in the range of 8 to 18 mol-%, yet more preferably in the range of 10 to 15 mol-%.

Preferably the heterophasic composition (HECO) has a xylene cold soluble (XCS) fraction (25° C.) in the range of 10 to 45 wt.-%, more preferably in the range of 12 to 35 wt.-%, still more preferably in the range of 15 to 30 wt.-% and most preferably in the range of 15 to 25 wt. %.

Preferably the ethylene content of the xylene cold soluble fraction (XCS) of the heterophasic composition (HECO) is in the range of 15 to 55 mol-%, more preferably in the range of 25 to 52 mol-%, still more preferably in the range of 35 to 50 mol-%, yet more preferably in the range of 40.0 to 48 mol-%.

In a preferred embodiment the intrinsic viscosity (IV) of the xylene cold soluble fraction (XCS) of the heterophasic composition (HECO) is at least 1.5 dl/g, more preferably at least 2.0 dug. On the other hand the intrinsic viscosity (IV) should be not too high otherwise the flowability is decreased. Thus the intrinsic viscosity of xylene cold soluble fraction (XCS) of the heterophasic composition (HECO) is preferably in the range of 1.5 to 4.0 dl/g, more preferably in the range 1.8 to 3.8 dl/g and even more preferably in the range of 2.0 to 3.5 dl/g.

The (semi)crystalline polypropylene (PP1) is preferably a (semi)crystalline random propylene copolymer (R-PP1) or a (semi)crystalline propylene homopolymer (H-PP1), the latter especially preferred.

In case the (semi)crystalline polypropylene (PP1) is a (semi)crystalline random propylene copolymer (R-PP1) it is appreciated that the (semi)crystalline random propylene copolymer (R-PP1) comprises monomers co-polymerizable with propylene, for example co-monomers such as ethylene and/or $C_4$ to $C_{12}$ α-olefins, in particular ethylene and/or $C_4$ to $C_8$ α-olefins, e.g. 1-butene and/or 1-hexene. Preferably the (semi)crystalline random propylene copolymer (R-PP1) according to this invention comprises, especially consists of, monomers co-polymerizable with propylene from the group consisting of ethylene, 1-butene and 1-hexene. More specifically the (semi)crystalline random propylene copolymer (R-PP1) of this invention comprises—apart from propylene—units derivable from ethylene and/or 1-butene. In a preferred embodiment the (semi)crystalline random propylene copolymer (R-PP1) comprises units derivable from ethylene and propylene only.

Additionally it is appreciated that the (semi)crystalline random propylene copolymer (R-PP1) has preferably a comonomer content in the range of more than 0.3 to 1.5 mol-%, more preferably in the range of more than 0.35 to 1.2 mol-%, yet more preferably in the range of 0.4 to 1.0 mol-%.

Further it is appreciated that the (semi)crystalline polypropylene (PP1), like (semi)crystalline propylene homopolymer (H-PP1), has a melt flow rate $MFR_2$ (230° C.) measured according to ISO 1133 of 70 to 200 g/10 min, more preferably of 80 to 190 g/10 min, still more preferably of 100 to 180 g/10 min, still more preferably of 130 to 170 g/10 min.

Further it is preferred that the semicrystalline polypropylene (PP1) according to this invention has a xylene soluble fraction (XCS) of not more than 10 wt.-%, in case of a (semi)crystalline propylene homopolymer (H-PP1) the xylene soluble fraction (XCS) is even lower, i.e. not more than 5.0 wt.-%.

Accordingly it is preferred that the (semi)crystalline propylene homopolymer (H-PP1) has a xylene soluble fraction (XCS) of below 5.0 wt.-%, more preferably in the range of 0.5 to 4.5, like in the range of 0.8 to 3.5 wt.-%.

The second component of the heterophasic composition (HECO) is the elastomeric propylene copolymer (EPR).

The elastomeric propylene copolymer (EPR) comprises, preferably consists of, units derivable from (i) propylene and (ii) ethylene.

The ethylene content of the elastomeric propylene copolymer (EPR) of the heterophasic composition (HECO) is in the range of 15 to 55 mol-%, more preferably in the range of 25 to 52 mol-%, still more preferably in the range of 35 to 50 mol-%, yet more preferably in the range of 40.0 to 48 mol-%.

The heterophasic composition (HECO) can be produced by blending the (semi)crystalline polypropylene (PP1) and the elastomeric propylene copolymer (EPR). However, it is preferred that the heterophasic composition (HECO) is produced in a sequential step process, using reactors in serial configuration and operating at different reaction conditions. As a consequence, each fraction prepared in a specific reactor may have its own molecular weight distribution and/or comonomer content distribution.

The heterophasic composition (HECO) according to this invention is preferably produced in a sequential polymerization process, i.e. in a multistage process, known in the art, wherein the (semi)crystalline polypropylene (PP1) is produced at least in one slurry reactor, preferably in a slurry reactor and optionally in a subsequent gas phase reactor, and subsequently the elastomeric propylene copolymer (EPR) is produced at least in one, i.e. one or two, gas phase reactor(s).

Accordingly it is preferred that the heterophasic composition (HECO) is produced in a sequential polymerization process comprising the steps of (a) polymerizing propylene and optionally at least one ethylene and/or $C_4$ to $C_{12}$ α-olefin in a first reactor (R1) obtaining the first polypropylene fraction of the (semi)crystalline polypropylene (PP1), preferably said first polypropylene fraction is a propylene homopolymer, (b) transferring the first polypropylene fraction into a second reactor (R2), (c) polymerizing in the second reactor (R2) and in the presence of said first polypropylene fraction propylene and optionally at least one ethylene and/or $C_4$ to $C_{12}$ α-olefin obtaining thereby the second polypropylene fraction, preferably said second polypropylene fraction is a second propylene homopolymer, said first polypropylene fraction and said second polypropylene fraction form the (semi)crystalline polypropylene (H-PP1), i.e. the matrix of the heterophasic composition (HECO), (d) transferring the (semi)crystalline polypropylene (PP1) of step (c) into a third reactor (R3), (e) polymerizing in the third reactor (R3) and in the presence of the (semi)crystalline polypropylene (PP1) obtained in step (c) propylene and ethylene the elastomeric propylene/ethylene copolymer fraction (EPR) dispersed in the (semi)crystalline polypropylene (PP1), the (semi)crystalline polypropylene (PP1) and the elastomeric propylene copolymer (EPR) form the heterophasic composition (HECO).

Of course, in the first reactor (R1) the second polypropylene fraction can be produced and in the second reactor (R2) the first polypropylene fraction can be obtained. The same holds true for the elastomeric propylene copolymer phase.

Preferably between the second reactor (R2) and the third reactor (R3) the monomers are flashed out.

The term "sequential polymerization process" indicates that the heterophasic composition (HECO) is produced in at least two, like three or four reactors connected in series. Accordingly the present process comprises at least a first reactor (R1) and a second reactor (R2), more preferably a first reactor (R1), a second reactor (R2), and a third reactor (R3). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) can be a slurry reactor, like a loop reactor, as the first reactor or alternatively a gas phase reactor (GPR).

The third reactor (R3) is preferably a gas phase reactor (GPR).

Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2) and the third reactor (R3) are gas phase reactors (GPR). Accordingly for the instant process at least three, preferably three polymerization reactors, namely a slurry reactor (SR), like a loop reactor (LR), a first gas phase reactor (GPR-1) and a second gas phase reactor (GPR-2) connected in series are used. If needed prior to the slurry reactor (SR) a pre-polymerization reactor is placed.

In another preferred embodiment the first reactor (R1) and second reactor (R2) are slurry reactors (SR), like a loop reactors (LR), whereas the third reactor (R3) is a gas phase reactors (GPR). Accordingly for the instant process at least three, preferably three polymerization reactors, namely two slurry reactors (SR), like two loop reactors (LR), and a gas phase reactor (GPR-1) connected in series are used. If needed prior to the first slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic composition (HECO) as defined above the conditions for the first reactor (R1), i.e. the slurry reactor (SR), like a loop reactor (LR), of step (a) may be as follows:
the temperature is within the range of 50° C. to 110° C., preferably between 60° C. and 100° C., more preferably between 68 and 95° C.,
the pressure is within the range of 20 bar to 80 bar, preferably between 40 bar to 70 bar,
hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The condition in the third reactor (R3), preferably in the second gas phase reactor (GPR-2) is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic composition (HECO) is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention for preparing the heterophasic composition (HECO) is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

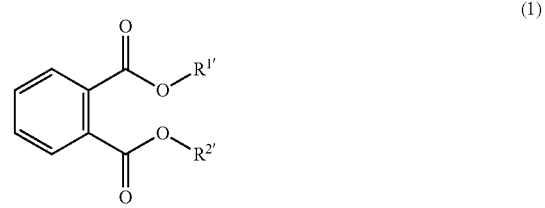

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$ The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2$*nROH, wherein R is methyl or ethyl, preferably ethyl and n is 1 to 6, is contacting with $TiCl_4$ to form a titanized carrier, followed by the steps of
adding to said titanised carrier
(i) a dialkylphthalate of formula (I) with $R^{1'}$ and $R^{2'}$ being independently at least a $C_5$-alkyl, like at least a $C_8$-alkyl,
or preferably
(ii) a dialkylphthalate of formula (I) with $R^{1'}$ and $R^{2'}$ being the same and being at least a $C_5$-alkyl, like at least a $C_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate, to form a first product, subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

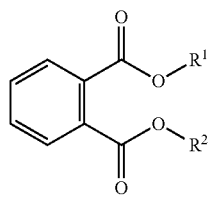

(II)

with $R^1$ and $R^2$ being methyl or ethyl, preferably ethyl, the dialkylphthalat of formula (II) being the internal donor and recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the heterophasic composition (HECO) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by $$Si(OCH_3)_2R_2^5 \quad \text{(IIIa)}$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by $$Si(OCH_2CH_3)_3(NR^xR^y) \quad \text{(IIIb)}$$

wherein $R^x$ and $R_y$ can be the same or different a represent a hydrocarbon group having 1 to 12 carbon atoms.

$R^x$ and $R_y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R_y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R_y$ are the same, yet more preferably both $R^x$ and $R_y$ are an ethyl group.

More preferably the external donor is of formula (Ma), like dicyclopentyl dimethoxy silane $[Si(OCH_3)_2(cyclo-pentyl)_2]$, diisopropyl dimethoxy silane $[Si(OCH_3)_2(CH(CH_3)_2)_2]$.

Most preferably the external donor is dicyclopentyl dimethoxy silane $[Si(OCH_3)_2(cyclo-pentyl)_2]$.

In a further embodiment, the Ziegler-Natta procatalyst can be modified by polymerising a vinyl compound in the presence of the catalyst system, comprising the special Ziegler-Natta procatalyst (component (i)), an external donor (component (iii) and optionally a cocatalyst (component (iii)), which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic composition (HECO) according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

The Plastomer (PL)

As mentioned above, the properties of the plastomer (PL) change due to the use of the peroxide (PO). That is the properties defined in this section may differ after the plastomer (PL) has been treated with the peroxide (PO). In particular, the density as well as the melt flow rate MFR$_2$ (190° C.) is affected. However, the comonomer content is not affected.

The plastomer (PL) can be any elastomeric polyolefin with the proviso that it chemically differs from the elastomeric ethylene/propylene copolymer (EPR) as defined herein. More preferably the plastomer (PL) is a very low density polyolefin, more preferably a very low density polyolefin polymerized using single site, preferably metallocene catalysis. Typically, the plastomer (PL) is an ethylene copolymer.

In a preferred embodiment, the plastomer (PL) has a density equal or below 0.880 g/cm$^3$. More preferably, the density of the plastomer (PL) is equal or below 0.879 g/cm$^3$, still more preferably in the range of 0.860 to 0.879 g/cm$^3$, like in the range of 0.864 to 0.875 g/cm$^3$.

Preferably, the plastomer (PL) has a melt flow rate MFR$_2$ (190° C., 2.16 kg) of less than 50 g/10 min, more preferably from 0.05 to 20 g/10 min, still more preferably from 0.1 to 10 g/10 min, like a range from 0.1 to 5 g/10 min.

Preferably, the plastomer (PL) comprises units derived from ethylene and a C4 to C20 α-olefin.

The plastomer (PL) comprises, preferably consists of, units derivable from (i) ethylene and (ii) at least another C4 to C20 α-olefin, like C4 to C10 α-olefin, more preferably units derivable from (i) ethylene and (ii) at least another α-olefin selected form the group consisting of 1-butene, 1-pentene, 1-hexene, 1-heptene and 1-octene. It is especially preferred that the plastomer (PL) comprises at least units derivable from (i) ethylene and (ii) 1-butene or 1-octene.

In an especially preferred embodiment, the plastomer (PL) consists of units derivable from (i) ethylene and (ii) 1-butene or 1-octene.

The comonomer content, like the C4 to C20 α-olefin content, of the plastomer (PL) is in the range of 20 to 60 wt.-%, more preferably in the range of 25 to 55 wt.-%, still more preferably in the range of 27 to 50 wt.-%, like in the range of 29 to 42 wt.-%.

In one preferred embodiment the elastomer (E) is prepared with at least one metallocene catalyst. The elastomer (E) may also be prepared with more than one metallocene catalyst or may be a blend of multiple elastomers prepared with different metallocene catalysts. In some embodiments, the elastomer (E) is a substantially linear ethylene polymer (SLEP). SLEPs and other metallocene catalysed elastomers (E) are known in the art, for example, U.S. Pat. No. 5,272,236. These resins are also commercially available, for example, as Queo™ plastomers available from Borealis, ENGAGE™ plastomer resins available from Dow Chemical Co. or EXACT™ polymers from Exxon or TAFMER™ polymers from Mitsui.

The High Flow Polypropylene (HPP)

In a preferred embodiment of the present application, the polypropylene composition comprises the heterophasic composition (HECO) as defined above, the plastomer (PL) as defined above and a high flow polypropylene (HPP). The high flow polypropylene (HPP) may also be affected by the peroxide but in less extent. If so, then the melt flow rate is slightly further increased.

Said high flow polypropylene (HPP) is preferably a high flow propylene random copolymer (R-HPP) or a high flow propylene homopolymer (H-HPP). It is especially preferred that the high flow polypropylene (HPP) is a high flow propylene homopolymer (H-HPP).

In case the high flow polypropylene (HPP) is a high flow random propylene copolymer (R-HPP) it is appreciated that the high flow random propylene copolymer (R-HPP) comprises monomers co-polymerizable with propylene, for example co-monomers such as ethylene and/or C$_4$ to C$_{12}$ α-olefins, in particular ethylene and/or C$_4$ to C$_8$ α-olefins, e.g. 1-butene and/or 1-hexene. Preferably the high flow random propylene copolymer (R-HPP) according to this invention comprises, especially consists of, monomers co-polymerizable with propylene from the group consisting of ethylene, 1-butene and 1-hexene. More specifically the high flow random propylene copolymer (R-HPP) of this invention comprises—apart from propylene—units derivable from ethylene and/or 1-butene. In a preferred embodiment the high flow random propylene copolymer (R-HPP) comprises units derivable from ethylene and propylene only.

Additionally it is appreciated that the high flow random propylene copolymer (R-HPP) has preferably a comonomer content in the range of more than 0.3 to 1.5 mol-%, more preferably in the range of more than 0.35 to 1.2 mol-%, yet more preferably in the range of 0.4 to 1.0 mol-%.

Preferably, the high flow polypropylene (HPP) has a higher melt flow rate MFR$_2$ (230° C.), measured according to ISO 1133, than the (semi)crystalline polypropylene (PP1) being the matrix (M) of the heterophasic composition (HECO).

It is especially preferred that the high flow polypropylene (HPP) has a melt flow rate MFR$_2$ (230° C.), measured according to ISO 1133, above 200 g/10 min, more preferably above 300 g/10 min, still more preferably above 600 g/10 min, like in the range of 700 to 1000 g/10 min.

Preferably, the polypropylene composition (PP) comprises 3 to 15 wt.-% of the high flow polypropylene (HPP), more preferably 5 to 12 wt.-%, still more preferably 6 to 10 wt.-%, based on the overall weight of the polypropylene composition (PP).

The Inorganic Filler (F)

As a further requirement of the composition according to this invention is the presence of an inorganic filler (F). Thus, the filler (F) is not regarded as being encompassed by the additives (AD) defined in more detail below.

Preferably inorganic filler (F) is mineral filler. It is appreciated that the inorganic filler (F) is a phyllosilicate, mica or wollastonite. Even more preferred the inorganic filler (F) is selected from the group consisting of mica, wollastonite, kaolinite, smectite, montmorillonite and talc. The most preferred the inorganic filler (F) is talc.

It is appreciated that the filler (F) has median particle size (D$_{50}$) in the range of 0.8 to 20 μm and a top cut particle size (D$_{95}$) in the range of 10 to 20 μm, preferably a median particle size (D$_{50}$) in the range of 5.0 to 8.0 μm and top cut particle size (D$_{95}$) in the range of 12 to 17 μm, more preferably a median particle size (D$_{50}$) in the range of 5.5 to 7.8 μm and top cut particle size (D$_{95}$) of 13 to 16.5 μm.

According to this invention the filler (F) does not belong to the class of alpha nucleating agents (NU) and additives (AD).

The filler (F) is state of the art and a commercially available product.

The Alpha Nucleating Agents (NU)

In one embodiment of the invention the composition (C) comprises alpha-nucleating agent, more preferably the composition is free of beta-nucleating agent.

According to this invention the alpha nucleating agent (NU) is not an additive (AD).

The alpha-nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis (4, 6,-di-tert-butylphenyl) phosphate or aluminium-hydroxy-bis[2,2'-methylene-bis(4,6-di-t-butylphenyl)phosphate], and (iv) vinylcycloalkane polymer or vinylalkane polymer, and (v) mixtures thereof.

Preferably the alpha-nucleating agent comprised in the composition of the invention is vinylcycloalkane polymer and/or vinylalkane polymer, more preferably vinylcycloalkane polymer, like vinylcyclohexane (VCH) polymer. Vinyl cyclohexane (VCH) polymer is particularly preferred as α-nucleating agent. It is appreciated that the amount of vinylcycloalkane, like vinylcyclohexane (VCH), polymer and/or vinylalkane polymer, more preferably of vinylcyclohexane (VCH) polymer, in the composition is not more than 500 ppm, preferably not more than 200 ppm, more preferably not more than 100 ppm, like in the range of 0.1 to 500 ppm, preferably in the range of 0.5 to 200 ppm, more preferably in the range of 1 to 100 ppm. Furthermore, it is appreciated that the vinylcycloalkane polymer and/or vinylalkane polymer is introduced into the composition by the BNT technology. With regard to the BNT-technology reference is made to the international applications WO 99/24478, WO 99/24479 and particularly WO 00/68315. According to this technology a catalyst system, preferably a Ziegler-Natta procatalyst, can be modified by polymerizing a vinyl compound in the presence of the catalyst system, comprising in particular the special Ziegler-Natta procatalyst, an external donor and a cocatalyst, which vinyl compound has the formula:

wherein $R^3$ and $R^4$ together form a 5- or 6-membered saturated, unsaturated or aromatic ring or independently represent an alkyl group comprising 1 to 4 carbon atoms, and the modified catalyst is preferably used for the preparation of the heterophasic composition (HECO) present in the modified polypropylene composition (mPP). The polymerized vinyl compound acts as an alpha-nucleating agent. The weight ratio of vinyl compound to solid catalyst component in the modification step of the catalyst is preferably of up to 5 (5:1), more preferably up to 3 (3:1), like in the range of 0.5 (1:2) to 2 (2:1).

Such nucleating agents are commercially available and are described, for example, in "Plastic Additives Handbook", 5th edition, 2001 of Hans Zweifel (pages 967 to 990).

Additives (AD)

In addition to the modified polypropylene composition (mPP) and the inorganic filler (F) the composition (C) of the invention may include additives (AD). Typical additives are acid scavengers, antioxidants, colorants, light stabilisers, plasticizers, slip agents, anti-scratch agents, dispersing agents, processing aids, lubricants, pigments, and the like. As indicated above the inorganic filler (F) is not regarded as an additive (AD).

Such additives are commercially available and for example described in "Plastic Additives Handbook", 6$^{th}$ edition 2009 of Hans Zweifel (pages 1141 to 1190).

Furthermore, the term "additives (AD)" according to the present invention also includes carrier materials, in particular polymeric carrier materials.

The Polymeric Carrier Material

Preferably the composition (C) of the invention does not comprise (a) further polymer (s) different to modified polypropylene composition (mPP), i.e. different to the heterophasic composition (HECO) and the plastomer (PL), in an amount exceeding 15 wt.-%, preferably in an amount exceeding 10 wt.-%, more preferably in an amount exceeding 9 wt.-%, based on the weight of the composition (C). If an additional polymer is present, such a polymer is typically a polymeric carrier material for the peroxide (PO) and the additives (AD). Any carrier material for additives (AD) is not calculated to the amount of polymeric compounds as indicated in the present invention, but to the amount of the respective additive.

Accordingly in the present invention it is distinguished between the polymeric carrier material of the peroxide (PO) and the additives (AD). As mentioned above, the polymeric carrier material of the peroxide (PO) is considered separately, whereas the polymeric carrier material of the additives (AD) is regarded as part of said additives (AD).

The polymeric carrier material of the additives (AD) is a carrier polymer to ensure a uniform distribution in the composition (C) of the invention. The polymeric carrier material is not limited to a particular polymer. The polymeric carrier material may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer.

The Article

The composition of the present invention is preferably used for the production of articles, more preferably of molded articles, yet more preferably of injection molded articles. Even more preferred is the use for the production of parts of washing machines or dishwashers as well as automotive articles, especially of car interiors and exteriors, like bumpers, side trims, step assists, body panels, spoilers, dashboards, interior trims and the like.

The current invention also provides articles, more preferably molded articles, like injection molded articles, comprising, preferably comprising at least 60 wt.-%, more preferably at least 80 wt.-%, yet more preferably at least 95 wt.-%, like consisting of, the inventive composition. Accordingly the present invention is especially directed to parts of washing machines or dishwashers as well as to automotive articles, especially to car interiors and exteriors, like bumpers, side trims, step assists, body panels, spoilers, dashboards, interior trims and the like, comprising, preferably comprising at least 60 wt.-%, more preferably at least 80 wt.-%, yet more preferably at least 95 wt.-%, like consisting of, the inventive composition.

The Use

The present invention is also directed to the use of a peroxide (PO) to reduce tiger skin of a polypropylene composition (PP) wherein a composition (C) is obtained, said composition (C) comprising a modified polypropylene composition (mPP) and an inorganic filler (F). Concerning the definition of the composition (C), the modified polypropylene composition (mPP), the polypropylene composition (PP) and the inorganic filler (F) reference is made to the information provided above.

The reduction of tiger skin is preferably accomplished in case of MSE values equal or below 30, more preferably in the range of 1 to 20, yet more preferably in the range of 1 to 7.

The present invention will now be described in further detail by the examples provided below.

EXAMPLES

1. Definitions/Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the comonomer content of the polymers. Quantitative $^{13}C$ {$^1H$} NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra.

Quantitative $^{13}C$ {$^1H$} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C$ {$^1H$} spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Calculation of ethylene content of the ethylene/propylene copolymer (EPR):

$$\frac{C(P) - w(A)xC(A)}{w(B)} = C(B)$$

wherein w(A) is the weight fraction [in wt.-%] of the (semi) crystalline polypropylene (PP1), w(B) is the weight fraction [in wt.-%] of the ethylene/propylene copolymer (EPR), C(A) is the comonomer content [in mol-%] of the (semi) crystalline polypropylene (PP1), C(P) is the comonomer content [in mol-%] of the heterophasic composition (HECO), C(B) is the calculated comonomer content [in mol-%] of the ethylene/propylene copolymer (EPR).

Quantification of Comonomer Content in Plastomer by NMR Spectroscopy

Quantitative nuclear-magnetic resonance (NMR) spectroscopy was used to quantify the comonomer content of the polymers. Quantitative $^{13}C$ {$^1H$} NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification [Klimke, K., Parkinson, M., Piel, C., Kaminsky, W., Spiess, H. W., Wilhelm, M., Macromol. Chem. Phys. 2006; 207:382; Parkinson, M., Klimke, K., Spiess, H. W., Wilhelm, M., Macromol. Chem. Phys. 2007; 208:2128; Castignolles, P., Graf, R., Parkinson, M., Wilhelm, M., Gaborieau, M., Polymer 50 (2009) 2373]. Standard single-pulse excitation was employed utilising the transient NOE at short recycle delays of 3 s [Pollard, M., Klimke, K., Graf, R., Spiess, H. W., Wilhelm, M., Sperber, O., Piel, C., Kaminsky, W., Macromolecules 2004; 37:813; Klimke, K., Parkinson, M., Piel, C., Kaminsky, W., Spiess, H. W., Wilhelm, M., Macromol. Chem. Phys. 2006; 207:382] and the RS-HEPT decoupling scheme[Filip, X., Tripon, C., Filip, C., J. Mag. Resn. 2005, 176, 239, Griffin, J. M., Tripon, C., Samoson, A., Filip, C., and Brown, S. P., Mag. Res. in Chem. 2007 45, S1, S198]. A total of 1024 (1k) transients were acquired per spectrum. This setup was chosen due its high sensitivity towards low comonomer contents. Quantitative $^{13}C$ $\{^1H\}$ NMR spectra were processed, integrated and quantitative properties determined using custom spectral analysis automation programs. All chemical shifts are internally referenced to the bulk methylene signal (δ+) at 30.00 ppm [J. Randall, Macromol. Sci., Rev. Macromol. Chem. Phys. 1989, C29, 201].

Characteristic signals corresponding to the incorporation of comonomers were observed [J. Randall, Macromol. Sci., Rev. Macromol. Chem. Phys. 1989, C29, 201] and all contents calculated with respect to all other monomers present in the polymer.

[For further information see Zhou, Z., Kuemmerle, R., Qiu, X., Redwine, D., Cong, R., Taha, A., Baugh, D. Winniford, B., J. Magn. Reson. 187 (2007) 225 and Busico, V., Carbonniere, P., Cipullo, R., Pellecchia, R., Severn, J., Talarico, G., Macromol. Rapid Commun. 2007, 28, 1128]

Comonomer content in plastomer (PL) was measured in a known manner based on Fourier transform infrared spectroscopy (FTIR) calibrated with $^{13}C$-NMR, using Nicolet Magna 550 IR spectrometer together with Nicolet Omnic FTIR software. Films having a thickness of about 250 μm were compression molded from the samples. Similar films were made from calibration samples having a known content of the comonomer. The comonomer content was determined from the spectrum from the wave number range of from 1430 to 1100 $cm^{-1}$. The absorbance is measured as the height of the peak by selecting the so-called short or long base line or both. The short base line is drawn in about 1410-1320 $cm^{-1}$ through the minimum points and the long base line about between 1410 and 1220 $cm^{-1}$. Calibrations need to be done specifically for each base line type. Also, the comonomer content of the unknown sample needs to be within the range of the comonomer contents of the calibration samples.

$MFR_2$ (230° C.) is measured according to ISO 1133 (230° C., 2.16 kg load).

$MFR_2$ (190° C.) is measured according to ISO 1133 (190° C., 2.16 kg load).

The xylene cold solubles (XCS, wt.-%): Content of xylene cold solubles (XCS) is determined at 25° C. according to ISO 16152; first edition; 2005-07-01.

Intrinsic viscosity is measured according to DIN ISO 1628/1, October 1999 (in Decalin at 135° C.).

Density is measured according to ISO 1183-187. Sample preparation is done by compression moulding in accordance with ISO 1872-2:2007.

Flexural Modulus and Flexural Strength were determined in 3-point-bending at 23° C. according to ISO 178 on 80×10×4 $mm^3$ test bars injection moulded in line with EN ISO 1873-2.

The tensile modulus and tensile strain at break were measured according to ISO 527-2 (cross head speed=1 mm/min; test speed 50 mm/min at 23° C.) using injection molded specimens as described in EN ISO 1873-2 (dog bone shape, 4 mm thickness). The measurement is done after 96 h conditioning time of the specimen.

Izod notched impact strength is determined according to ISO 180/1A at 23° C. and at −20° C. by using injection moulded test specimens as described in EN ISO 1873-2 (80×10×4 mm).

Heat deflection temperature was measured according to ISO 75-2: Methods A and B.

Shrinkage: The shrinkage is determined on centre gated, injection moulded circular disks (diameter 180 mm, thickness 3 mm, having a flow angle of 355° and a cut out of 5°). Two specimens are moulded applying two different holding pressure times (10 s and 20 s respectively). The melt temperature at the gate is 260° C., and the average flow front velocity in the mould 100 mm/s. Tool temperature: 40° C., back pressure: 600 bar.

After conditioning the specimen at room temperature for 96 hours the dimensional changes radial and tangential to the flow direction are measured for both disks. The average of respective values from both disks are reported as final results.

Flow Marks

The tendency to show flow marks was examined with a method as described below. This method is described in detail in WO 2010/149529, which is incorporated herein in its entirety.

An optical measurement system, as described by Sybille Frank et al. in PPS 25 Intern. Conf. Polym. Proc. Soc 2009 or Proceedings of the SPIE, Volume 6831, pp 68130T-68130T-8 (2008) was used for characterizing the surface quality.

This method consists of two aspects:

1. Image Recording:

The basic principle of the measurement system is to illuminate the plates with a defined light source (LED) in a closed environment and to record an image with a CCD-camera system.

2. Image Analysis:

The specimen is floodlit from one side and the upwards reflected portion of the light is deflected via two mirrors to a CCD-sensor. The such created grey value image is analyzed in lines. From the recorded deviations of grey values the mean square error (MSE) is calculated allowing a quantification of surface quality, i.e. the larger the MSE value the more pronounced is the surface defect.

Generally, for one and the same material, the tendency to flow marks increases when the injection speed is increased.

For this evaluation plaques 440×148×2.8 mm with grain VW K50 and a filmgate of 1.4 mm were used and were produced with different filling times of 1.5, 3 and 6 sec respectively.

Further conditions:

Melt temperature: 240° C.

Mould temperature 30° C.

Dynamic pressure: 10 bar hydraulic

The smaller the MSE value is at a certain filling time, the smaller is the tendency for flow marks.

The Particle Size median ($D_{50}$) and top cut ($D_{95}$) are calculated from the particle size distribution determined by laser diffraction according to ISO 13320-1:1999.

2. Examples

Preparation of HECO

Catalyst

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP 491566, EP 591224 and EP 586390.

The catalyst was further modified (VCH modification of the catalyst).

35 ml of mineral oil (Paraffinum Liquidum PL68) was added to a 125 ml stainless steel reactor followed by 0.82 g of triethyl aluminium (TEAL) and 0.33 g of dicyclopentyl dimethoxy silane (donor D) under inert conditions at room temperature. After 10 minutes 5.0 g of the catalyst prepared above (Ti content 1.4 wt.-%) was added and after additionally 20 minutes 5.0 g of vinylcyclohexane (VCH) was added. The temperature was increased to 60° C. during 30 minutes and was kept there for 20 hours. Finally, the temperature was decreased to 20° C. and the concentration of unreacted VCH in the oil/catalyst mixture was analysed and was found to be 200 ppm weight.

TABLE 1

Polymerization of HECO

| | | HECO |
|---|---|---|
| Prepoly | | |
| Residence time | [h] | 0.17 |
| Temperature | [° C.] | 30 |
| Co/ED ratio | [mol/mol] | 5.01 |
| Co/TC ratio | [mol/mol] | 200 |
| Loop (R1) | | |
| Residence time | [h] | 0.34 |
| Temperature | [° C.] | 80 |
| $H_2/C_3$ ratio | [mol/kmol] | 7 |
| MFR | [g/10 min] | 162 |
| XCS | [wt %] | 2.0 |
| C2 content | [wt %] | 0 |
| split | [wt %] | 34 |
| 1$^{st}$ GPR (R2) | | |
| Residence time | [h] | 1.20 |
| Temperature | [° C.] | 95 |
| Pressure | [bar] | 15 |
| $H_2/C_3$ ratio | [mol/kmol] | 84 |
| MFR | [g/10 min] | 159 |
| XCS | [wt %] | 2.9 |
| C2 content | [wt %] | 0 |
| split | [wt %] | 45 |

TABLE 1-continued

Polymerization of HECO

| | | HECO |
|---|---|---|
| 2$^{nd}$ GPR (R3) | | |
| Residence time | [h] | 0.21 |
| Temperature | [° C.] | 85 |
| Pressure | [bar] | 14 |
| $C_2/C_3$ ratio | [mol/kmol] | 600 |
| $H_2/C_2$ ratio | [mol/kmol] | 170 |
| MFR | [g/10 min] | 66 |
| XCS | [wt %] | 19.8 |
| C2 content | [wt %] | 12.80 |
| split | [wt %] | 21 |

The HECO was mixed in a twin-screw extruder with 1.00 wt.-% Talc 3.1 (CAS-no. 14807-96-6, trade name Talc HM 2 supplied by IMI), 0.25 wt.-% Dimodan HPL 80/BB, 0.1 wt.-% of a blend of 67% tris(2,4-ditert-butylphenyl)phosphite and 33% pentaerythritol tetrakis[3-[3,5-di-tert-butyl-4-hydroxyphenyl]propionate] (trade name Irganox B 215 FF) supplied by BASF AG and 0.05 wt.-% Calciumstearate (CAS-no. 1592-23-0) supplied by Croda Polymer Additives.

Preparation of the Composition (C)

Example CE1 (Comparative)

56.7 wt.-% of HECO, 6.0 wt.-% of the propylene homopolymer HL508FB by Borealis, 20.0 wt.-% of the ethylene-octene copolymer Engage XLT by Dow, 13.0 wt.-% of Talc (Jetfine 3CA by Imerys), 3.0 wt.-% of a masterbatch of 70 wt % of linear density polyethylene (LDPE) and 30 wt % carbon black, 0.3 wt.-% of the UV-stabilizer masterbatch Cyasorb UV-3808PP5 by Cytec, 0.1 wt.-% of Pentaerythrityl-tetrakis(3-(3',5'-di-tert. butyl-4-hydroxyphenyl)-propionate (Songnox 1010FFby Songwon), 0.1 wt.-% of Tris (2,4-di-t-butylphenyl) phosphite (Kinox-68-G by HPL Additives), 0.3 wt.-% of Oleamide 9-octadecenamide by Croda, 0.2 wt.-% of antistatic agent Dimodan HP FF by Danisco and 0.3 wt.-% of Calciumstearate by Faci were melt blended on a co-rotating twin screw extruder. The polymer melt mixture was discharged and pelletized.

Example IE1 (Inventive)

To a mixture of 56.5 wt.-% of HECO, 6.0 wt.-% of the propylene homopolymer HL508FB by Borealis and 20.0 wt.-% of the ethylene-octene copolymer Engage XLT by Dow, 0.2 wt.-% of a masterbatch of 5 wt.-% 2,5-dimethyl-2,5-di-(tert-butylperoxy)hexane with polypropylene were dosed in the main hopper of a twin screw extruder Mega Compounder ZSK 18 (screw length 40 D) with a temperature profile 20/190/220/225/230/230/210/200° C. and a screw speed of 300 rpm. The polymer melt mixture was melt blended with 13.0 wt.-% of Talc (Jetfine 3CA by Imerys), 3.0 wt.-% of a masterbatch of 70 wt % of linear density polyethylene (LDPE) and 30 wt % carbon black, 0.3 wt.-% of the UV-stabilizer masterbatch Cyasorb UV-3808PP5 by Cytec, 0.1 wt.-% of Pentaerythrityl-tetrakis(3-(3',5'-di-tert. butyl-4-hydroxyphenyl)-propionate (Songnox 1010FFby Songwon), 0.1 wt.-% of Tris (2,4-di-t-butylphenyl) phosphite (Kinox-68-G by HPL Additives), 0.3 wt.-% of Oleamide 9-octadecenamide by Croda, 0.2 wt.-% of antistatic agent Dimodan HP FF by Danisco and 0.3 wt.-% of Calciumstearate by Faci on a co-rotating twin screw extruder, discharged and pelletized.

Example IE2 (Inventive)

IE2 was prepared analogously to IE1 with the difference that 56.3 wt.-% of the HECO and 0.4 wt.-% of the masterbatch of 5 wt.-% 2,5-dimethyl-2,5-di-(tert-butylperoxy)hexane with polypropylene were applied.

Example CE2 (Comparative)

CE2 was prepared analogously to CE1 with the difference that the ethylene-octene copolymer Queo 2M137 by Borealis was applied instead of Engage XLT by Dow.

Example IE3 (Inventive)

IE3 was prepared analogously to IE1 with the difference that the ethylene-octene copolymer Queo 2M137 by Borealis was applied instead of Engage XLT by Dow.

Example CE4 (Comparative)

CE4 was prepared analogously to CE1 with the difference that 64.0 wt.-% of the HECO, 19.0 wt.-% of the ethylene-butene copolymer Engage 7487 HM by Dow instead of Engage XLT by Dow and 3.0 wt.-% of pigments were applied. The propylene homopolymer HL508FB by Borealis was not applied according to CE4.

Example IE6 (Inventive)

IE6 was prepared analogously to IE1 with the difference that 63.6 wt.-% of the HECO, 19.0 wt.-% of the ethylene-butene copolymer Engage 7487 HM by Dow instead of Engage XLT by Dow, 0.6 wt.-% of the masterbatch of 5 wt.-% 2,5-dimethyl-2,5-di-(tert-butylperoxy)hexane with polypropylene and 4.2 wt.-% of pigments were applied. The propylene homopolymer HL508FB by Borealis was not applied according to IE6.

TABLE 2

Composition of comparative and inventive examples

|  |  | CE1 | IE1 | IE2 | CE2 | IE3 | IE4 | CE3 | IE5 | CE4 | IE6 |
|---|---|---|---|---|---|---|---|---|---|---|---|
| HECO | [wt.-%] | 56.7 | 56.5 | 56.3 | 56.7 | 56.5 | 56.3 | 56.7 | 56.3 | 64.0 | 63.4 |
| HPP | [wt.-%] | 6.0 | 6.0 | 6.0 | 6.0 | 6.0 | 6.0 | 6.0 | 6.0 | — | — |
| PL1 | [wt.-%] | 20.0 | 20.0 | 20.0 | — | — | — | — | — | — | — |
| PL2 | [wt.-%] | — | — | — | 20.0 | 20.0 | 20.0 | — | — | — | — |
| PL3 | [wt.-%] | — | — | — | — | — | — | 20.0 | 20.0 | — | — |
| PL4 | [wt.-%] | — | — | — | — | — | — | — | — | 19.0 | 19.0 |
| Talc | [wt.-%] | 13.0 | 13.0 | 13.0 | 13.0 | 13.0 | 13.0 | 13.0 | 13.0 | 13.0 | 13.0 |
| Pigments | [wt.-%] | 3.0 | 3.0 | 3.0 | 3.0 | 3.0 | 3.0 | 3.0 | 3.0 | 3.0 | 3.0 |
| AD | [wt.-%] | 1.3 | 1.3 | 1.3 | 1.3 | 1.3 | 1.3 | 1.3 | 1.3 | 1.3 | 1.3 |
| POX PP | [wt.-%] | — | 0.2 | 0.4 | — | 0.2 | 0.4 | — | 0.4 | — | 0.60 |

Example IE4 (Inventive)

IE4 was prepared analogously to IE1 with the difference that difference that 56.3 wt.-% of the HECO and 0.4 wt.-% of the masterbatch of 5 wt.-% 2,5-dimethyl-2,5-di-(tert-butylperoxy)hexane with polypropylene were applied and the ethylene-octene copolymer Queo 2M137 by Borealis was applied instead of Engage XLT by Dow.

Example CE3 (Comparative)

CE3 was prepared analogously to CE1 with the difference that the ethylene-octene copolymer Queo 2M138 by Borealis was applied instead of Engage XLT by Dow.

Example IE5 (Inventive)

IE5 was prepared analogously to IE1 with the difference that difference that 56.3 wt.-% of the HECO and 0.4 wt.-% of the masterbatch of 5 wt.-% 2,5-dimethyl-2,5-di-(tert-butylperoxy)hexane with polypropylene were applied and the ethylene-octene copolymer Queo 2M138 by Borealis was applied instead of Engage XLT by Dow.

HPP is the commercial propylene homopolymer HL508FB by Borealis having a melt flow rate $MFR_2$ (230° C.) of 800 g/10 min.

PL1 is the commercial ethylene-octene copolymer Engage XLT by Dow having a density of 0.875 g/cm$^3$, a melt flow rate $MFR_2$ (190° C.) of 0.5 g/10 min and an 1-octene content of 14.5 mol-%.

PL2 is the commercial ethylene-octene copolymer Queo 2M137 by Borealis having a density of 0.870 g/cm$^3$, a melt flow rate $MFR_2$ (190° C.) of 1.0 g/10 min and an 1-octene content of 9.9 mol-%.

PL3 is the commercial ethylene-octene copolymer Queo 2M138 by Borealis having a density of 0.868 g/cm$^3$, a melt flow rate $MFR_2$ (190° C.) of 0.5 g/10 min and an 1-octene content of 11.0 mol-%.

PL4 is the commercial ethylene-butene copolymer Engage HM 7487 by Dow having a density of 0.860 g/cm$^3$, a melt flow rate $MFR_2$ (190° C.) of 0.5 g/10 min and an 1-butene content of 19.1 mol-%.

Talc is the commercial Talc Jetfine 3CA by Imerys having a d50 (Sedigraph 5100) of 1.0 μm and d95 (Sedigraph 5100) of 3.3 μm Pigments is a masterbatch of 70 wt % of linear density polyethylene (LDPE) and 30 wt % carbon black, with MFR (190°/21.6 kg) of 15 g/10 min.

AD 0.3 wt.-% of the UV-stabilizer masterbatch Cyasorb UV-3808PP5 by Cytec, 0.1 wt.-% of Pentaerythrityl-tetrakis(3-(3',5'-di-tert. butyl-4-hydroxyphenyl)-propionate (Songnox 1010FFby Songwon), 0.1 wt.-% of Tris (2,4-di-t-butylphenyl) phosphite (Kinox-68-G by HPL Additives), 0.3 wt.-% of Oleamide 9-octadecenamide by Croda, 0.2 wt.-% of antistatic agent Dimodan HP FF by Danisco and 0.3 wt.-% of Calciumstearate by Faci PDX PP is a masterbatch of 5 wt.-% 2,5-dimethyl-2,5-di-(tert-butylperoxy)hexane with polypropylene.

TABLE 3

Properties of comparative and inventive examples

|  |  | CE1 | IE1 | IE2 | CE2 | IE3 | IE4 | CE3 | IE5 | CE4 | IE6 |
|---|---|---|---|---|---|---|---|---|---|---|---|
| XCS (total) | [wt.-%] | 31.1 | 31.1 | 31.1 | 31.1 | 31.1 | 31.1 | 31.1 | 31.1 | nd | nd |
| $MFR_2$ | [g/10 min] | 32.1 | 35.2 | 38.4 | 35.5 | 38.8 | 44.6 | 32.4 | 41.1 | 21.5 | 34.1 |
| C2 (XCS)[1] | [mol-%] | 59 | nd | 59 | 59 | nd | nd | nd | 59 | nd | nd |
| IV (XCS)[1] | [dl/g] | 2.30 | 2.28 | 2.22 | 2.20 | 2.18 | 2.15 | 2.13 | 2.08 | 2.30 | 2.21 |
| IV (XCI)[1] | [dl/g] | 1.05 | 1.03 | 0.99 | 1.05 | 1.03 | 1.01 | 1.05 | 1.02 | 1.08 | 1.03 |
| IV (XCS)/IV(XCI)[1] | [-] | 2.19 | 2.21 | 2.24 | 2.09 | 2.11 | 2.12 | 2.03 | 2.04 | 2.12 | 2.14 |
| IV total[1] | [dl/g] | 1.34 | 1.32 | 1.28 | 1.33 | 1.30 | 1.30 | 1.31 | 1.28 | 1.37 | 1.31 |
| Density | [g/cm$^3$] | 0.977 | 0.977 | 0.977 | 0.962 | 0.964 | 0.962 | 0.963 | 0.964 | nd | nd |
| Flexural modulus | [MPa] | 1463 | 1436 | 1392 | 1511 | 1482 | 1469 | 1495 | 1442 | 1609 | 1469 |
| Flexural strength |  | 23.3 | 22.8 | 22.3 | nd | 24.7 | 24.3 | 24.3 | 23.4 | 24.5 | 23.0 |
| Tensile modulus | [MPa] | 1464 | 1453 | 1411 | 1519 | 1503 | 1486 | 1483 | 1435 | nd | nd |
| Tensile stress at yield | [kJ/m$^2$] | 16.8 | 16.5 | 16.0 | 18.1 | 17.8 | 17.3 | 17.7 | 16.7 | nd | nd |
| Tensile stress at break | [kJ/m$^2$] | 40.6 | 31.7 | 21.3 | 21.7 | 14.8 | 9.7 | 26.4 | 11.9 | nd | nd |
| Heat deflection temperature A (1.80 MPa) | [° C.] | 50.7 | 50.6 | 50.4 | 50.8 | 50.7 | 50.1 | 50.7 | 50.2 | — | — |
| Heat deflection temperature B (0.45 MPa) | [° C.] | — | — | — | — | — | — | — | — | 94.1 | 89.1 |
| Izod impact strength, notched (+23° C.) | [kJ/m$^2$] | 29.4 | 23.1 | 21.3 | 45.6 | 24.1 | 15.3 | 36.0 | 14.8 | 16.5 | 10.5 |
| Izod impact strength, notched (−20° C.) | [kJ/m$^2$] | 7.4 | 6.9 | 6.7 | 5.4 | 5.1 | 4.8 | 5.8 | 5.5 | 5.7 | 5.2 |
| Mould average shrinkage (disk) | [%] | 1.11 | 1.12 | 1.18 | 1.14 | 1.06 | 1.08 | 1.01 | 1.07 | nd | nd |
| MSE 1.5 s | [-] | 8.5 | 5.4 | 4.8 | 11.1 | 6.6 | 3.7 | 10.7 | 3.1 | 57.5 | 6.4 |
| MSE 3 s | [-] | 4.0 | 3.0 | 3.0 | 5.0 | 4.0 | 3.0 | 5.0 | 3.0 | 55.0 | 5.0 |
| MSE 6 s | [-] | 4.0 | 5.0 | 4.0 | 3.0 | 3.0 | 3.5 | 4.0 | 3.8 | 45.0 | 3.0 |

[1]Values determined from compositions not containing talc

The invention claimed is:

1. A composition comprising a modified polypropylene composition and an inorganic filler, wherein the modified polypropylene composition is obtained by treatment of a polypropylene composition with a peroxide (PO), the polypropylene composition comprising:
   (a) a heterophasic composition, comprising:
      (a1) a (semi)crystalline polypropylene, and
      (a2) an elastomeric ethylene/propylene copolymer dispersed in the (semi)crystalline polypropylene,
   (b) a plastomer being a copolymer of ethylene and at least one C4 to C20 α-olefin, and
   (c) optionally a high flow polypropylene, the high flow polypropylene having a higher melt flow rate $MFR_2$ (230° C.), measured according to ISO 1133, than the (semi)crystalline polypropylene,
   wherein the modified polypropylene composition has:
      (i) a melt flow rate $MFR_2$ (230° C.) measured according to ISO 1133 above 32 g/10 min, and
      (ii) an intrinsic viscosity determined according to DIN ISO 1628/1 (in Decalin at 135° C.) of the xylene soluble fraction below 2.30 dl/g and
      (iii) an intrinsic viscosity determined according to DIN ISO 1628/1 (in Decalin at 135° C.) of the xylene insoluble fraction below 1.05 dl/g.

2. The composition according to claim 1, wherein the plastomer is a copolymer of ethylene and 1-butene or 1-octene.

3. The composition according to claim 1, wherein the weight ratio of the heterophasic composition and the plastomer in the polypropylene composition is in the range of 0.1 to 10.0.

4. The composition according to claim 1, wherein the polypropylene composition comprises 3 to 15 wt.-%, based on the overall weight of the polypropylene composition, of the high flow polypropylene having a higher melt flow rate $MFR_2$ (230° C.), measured according to ISO 1133, than the (semi)crystalline polypropylene.

5. The composition according to claim 1, comprising:
   (a) 45 to 95 wt.-% of the modified polypropylene composition, and
   (b) 5 to 30 wt.-% of the inorganic filler (F), based on the overall weight of the composition (C).

6. The composition according to claim 1, wherein the heterophasic composition has:
   (a) a comonomer content, based on the total weight of the heterophasic composition (HECO), in the range of 3 to 20 wt.-%,
   and/or
   (b) a xylene soluble fraction in the range of 10 to 35 wt.-%,
   and/or
   (c) a melt flow rate $MFR_2$ (230° C.) measured according to ISO 1133 from 40 to 100 g/10 min.

7. The composition according to claim 1, wherein the xylene soluble fraction of the heterophasic composition has:
   (a) an intrinsic viscosity determined according to DIN ISO 1628/1 (in Decalin at 135° C.) in the range of 1.5 to 4.5 dl/g, and
   (b) a comonomer content, based on the total weight of the xylene soluble fraction of the heterophasic composition, in the range of 25 to 55 wt.-%.

8. The composition according to claim 1, wherein the plastomer has
   (a) a melt flow rate MFR (190° C.) measured according to ISO 1133 from 0.05 to 5.0 g/10 min,
   (b) a comonomer content, based on the total weight of the plastomer, in the range of 5 to 25 mol-%, and
   (c) a density equal or below 0.880 g/cm$^3$.

9. The composition according to claim 1, wherein the inorganic filler is talc.

10. An injection moulded automotive article comprising a composition comprising:

a modified polypropylene composition and an inorganic filler, wherein the modified polypropylene composition is obtained by treatment of a polypropylene composition with a peroxide (PO), the polypropylene composition comprising:

(a) a heterophasic composition, comprising:
   (a1) a (semi)crystalline polypropylene, and
   (a2) an elastomeric ethylene/propylene copolymer dispersed in the (semi)crystalline polypropylene,
(b) a plastomer being a copolymer of ethylene and at least one C4 to C20 α-olefin, and
(c) optionally a high flow polypropylene, the high flow polypropylene having a higher melt flow rate $MFR_2$ (230° C.), measured according to ISO 1133, than the (semi)crystalline polypropylene, wherein the modified polypropylene composition has:
   (i) a melt flow rate $MFR_2$ (230° C.) measured according to ISO 1133 above 32 g/10 min, and
   (ii) an intrinsic viscosity determined according to DIN ISO 1628/1 (in Decalin at 135° C.) of the xylene soluble fraction below 2.30 dl/g and
   (iii) an intrinsic viscosity determined according to DIN ISO 1628/1 (in Decalin at 135° C.) of the xylene insoluble fraction below 1.05 dl/g.

11. A process for the preparation of the composition according to claim 1, wherein
(a)
   (a1) the polypropylene composition comprising the heterophasic composition, the plastomer and optionally the high flow polypropylene is extruded in an extruder in the presence of the peroxide to obtain the modified polypropylene composition, and
   (b1) the modified polypropylene composition is melt blended with the inorganic filler,
or
(b) the polypropylene composition comprising the heterophasic composition, the plastomer, optionally the high flow polypropylene, and the inorganic filler are extruded in an extruder in the presence of the peroxide.

12. The process of claim 11, wherein the peroxide reduces tigerskin in the polypropylene composition.

13. The process according to claim 12, wherein the reduction of tigerskin is characterized by a mean square error values equal to or below 30 for a gray scale image of the polypropylene composition.

* * * * *